United States Patent [19]

McCormack et al.

[11] 4,110,017

[45] Aug. 29, 1978

[54] LOW-FREQUENCY SOUND PROGRAM GENERATION

[75] Inventors: Thomas L. McCormack, Arleta; Albert P. Green, Los Angeles, both of Calif.

[73] Assignee: Warner Bros. Inc., Burbank, Calif.

[21] Appl. No.: 803,212

[22] Filed: Jun. 3, 1977

[51] Int. Cl.[2] .......... G03B 31/00

[52] U.S. Cl. .......... 352/5; 352/6; 352/7; 352/10; 352/25; 352/40; 352/85

[58] Field of Search .......... 352/1, 3, 5, 11, 12, 352/13, 25, 26, 27, 36, 37, 38, 40, 85, 92, 131; 340/384 R, 384 E, 385, 386; 272/9, 14; 179/1 AT, 1 SS, 15.55 R; 340/18 DR, 18 DC, 15.5 F; 360/3; 181/139, 142

[56] References Cited

U.S. PATENT DOCUMENTS 3,973,839 8/1976 Stumpf .......... 352/5

OTHER PUBLICATIONS

American Cinematographer, Jun. 1977, pp. 592–594t, 596t, 597t.

*Primary Examiner*—Russell E. Adams
*Attorney, Agent, or Firm*—Gottlieb, Rackman & Reisman

[57] ABSTRACT

There is disclosed a method for generating a low-frequency sound program for play during the performance of a motion picture film to produce a physical effect on the theater audience. Rather than to use random low-frequency noise or some other low-frequency source which is unrelated to the audible sound program, the low-frequency program is derived by shifting down in frequency a selected portion of the audible sound program. The final low-frequency program contains frequency components below 40 Hz, at least 50% of the total energy of which is derived from the shifted-down audible program. By so harmonically relating the audible and low-frequency programs, the audio/visual and vibrational sensations are perceived in a less disjointed fashion.

11 Claims, 1 Drawing Figure

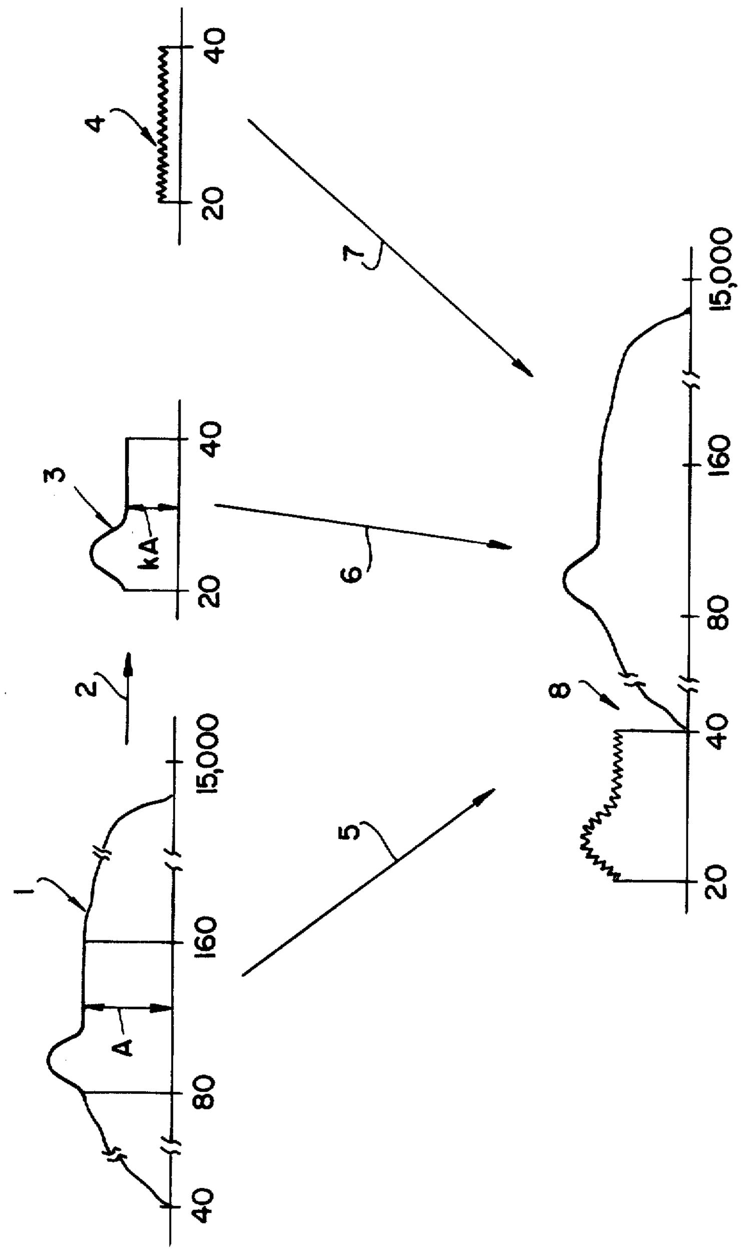
4
20
40
3
kA
20
40
7
6
15,000
160
80
40
20
8
2
1
A
5
40
80
160
15,000

LOW-FREQUENCY SOUND PROGRAM GENERATION

This invention relates to the preparation of a low-frequency sound program for play during the performance of a motion picture film to produce a physical effect on the theater audience, and more particularly to the preparation of a low-frequency program which produces an effect which is less disjointed from the audio/visual sensation than has been achieved in the prior art.

It has been known for many years that high-intensity, low-frequency sound creates a vibrational effect on an audience which is like that which occurs during an earthquake. One way to generate such a sound is with the use of a long (low-frequency) organ pipe. Such an arrangement is described in connection with a stage production in a book entitled "Doctor Wood" by William Seabrook, published by Harcourt, Brace & Co., 1941, page 283.

The same kind of effect is advantageous during the play of certain motion picture films. If a low-frequency sound program is generated together with play of the audible sound program, and if the theater amplifiers and speakers are capable of reproducing low-frequency signals with the requisite intensity, the audience viewing a motion picture film may be made to experience the physiological and psychological sensation of an earthquake or some other, even dissimilar, event. For example, several current-day films have themes relating to the devil, and it may be advantageous to "shake" the audience when the devil's presence is depicted on the screen. Unfortunately, conventional theater amplifiers and speakers have too poor a low-frequency response to reproduce low-frequency sound to any significant degree. To produce the desired audience reaction, the sound pressure level may have to exceed 125 db, something which just cannot be achieved with the use of conventional theater sound equipment.

In recent years, however, considerable work has been done in extending the low-frequency capability of amplifiers and speakers, the impetus for much of this work having been the proliferation of "rock" music concerts. When low-frequency amplifiers and speakers became commercially available, they were added to the conventional theater sound equipment to generate low-frequency vibratory sound. One such system is disclosed in U.S. Pat. No. 3,973,839, issued on Aug. 10, 1976.

The system disclosed in the aforesaid patent does not utilize a film track on which there is recorded a low-frequency sound program. Instead, a low-frequency noise generator is provided in the theater from which an input signal for the low-frequency amplifiers is derived. The low-frequency channel is turned on and off in accordance with control signals recorded on the film together with the audible sound program.

Prior art workers have recognized that there is no need to employ a noise generator in each theater where the desired effect is to be produced; the low-frequency sound program can be recorded on the film itself. One way to do this is to use a noise generator during the dubbing of a motion picture film. The same low-frequency random noise produced in a theater by a noise generator can be recorded in the audio track and reproduced through the low-frequency amplifiers and speakers installed in the theater. (A preferred system for controlling the sound generation in a theater, no matter how the low-frequency program material itself is derived, is disclosed in our copending application Ser. No. 803,211 filed on even date herewith.)

In the case of a motion picture film whose theme revolves around an earthquake, the use of random noise in this manner produces a physical effect comparable to that experienced during an earthquake. That is because the low-frequency sound generated during the course of an earthquake is itself random. But in many other situations it has been found that random low-frequency noise, while it may shake a theater audience, does so in a way which produces a physical sensation which is completely disjointed from the scene being viewed on the screen and the sound (dialog, music, real-life noise and special effects) which is being heard. The physical sensation is not perceived as being "natural" in the context of the audio/visual perception. At worst, the effect can even be annoying if the physical sensation is completely unrelated to what is being otherwise sensed.

It is, of course, possible to take real-life recordings of events being depicted on the screen and to use the low-frequency portion of the recording as the input to the low-frequency amplifiers and speakers. But this does not always solve the problem. There are many events for which there are no associated real-life low frequencies. For example, consider a motion picture whose theme is the devil, and whose presence on the screen is to be "felt" by the audience by creating a low-frequency vibrational effect; there is no known low-frequency program material which is associated with the devil. Similarly, consider the case of a film whose theme is that of an attacking swarm of bees or other insects. The ("buzzing") frequencies associated with this type of phenomenon are relatively high. The fear induced in the audience by what it is seeing and hearing can be enhanced perhaps by shaking them, but there is no naturally occurring low-frequency programming material which could be used for this purpose. And the use of random noise may result in disjointed audio/visual and physical perceptions.

It is a general object of our invention to create a low-frequency program for play during the performance of a motion picture film which produces a physical or vibrational sensation which is integrated with and blends into the audio/visual sensation.

Briefly, in accordance with the principles of our invention, the audible sound portion of a motion picture film is used to generate at least a portion of the low-frequency (generally inaudible) sound program which is played in synchronism with it. A selected band of frequencies in the audible sound program is shifted down, preferably in a integral manner. The low-frequency portion of the program, or at least a substantial part of it, is thus related to a portion of the audible sound program in an harmonic sense. Preferably, the frequency band of the audible portion of the program which is selected for generating the low-frequency program portion is a band which to a great extent characterizes what is being heard. (While the selection of the band of frequencies to be shifted down necessarily requires subjective judgment, it is a relatively simple matter to determine a band of frequencies in the audible program whose energy content is relatively high. For example, the entire audible spectrum can be viewed on a spectrum analyzer, although experienced sound engineers and dubbing personnel can select an appropriate band simply by listening to the audible program material.)

It is low frequencies below 40 Hz, and preferably in the 20–40 Hz range, which are most effective in producing vibrational effects. Consider, for example, a portion of the audible sound program of a film which contains a substantial energy content in the 80–120 Hz range. By shifting down the frequencies in this band and in effect dividing each of them by the integral factor 5, the frequencies in the 100–200 Hz range result in a band of frequencies in the 20–40 Hz range. When such a low-frequency program is reproduced in the theater, because of the harmonic relationship between the low-frequency sound and a dominant or important part of the audible sound, we have found that the audio/visual and physical sensations or perceptions blend together.

This is not to say that the entire low-frequency program below 40 Hz must consist of components whose frequencies are an integral fraction of respective frequency components in the audible sound program. We have found that the blending or unitary-perception effect is achieved if at least 50% of the total energy below 40 Hz consists of frequency components which are related in an harmonic fashion to respective higher frequency components in the audible sound program. Furthermore, an exact integral or harmonic relationship is not essential, as long as the ratio of each original frequency to its shifted down derivative is an integral number, plus or minus at most 10%. Thus not only does a frequency of 30 Hz blend with its "parent" frequency of 300 Hz (after dividing by 10), but so do the frequencies (approximately 27–33 Hz) derived by dividing 300 Hz by any value in the range 9–11 (10, plus or minus 10%).

As an example, consider the case of a scene depicting a speeding racing car. There is a natural low-frequency inaudible "rumble" associated with this event, but it is not sufficient, perhaps even if amplified to a sound pressure level in excess of 125 db, to shake a theater audience in a manner that is perceived to be natural. What is perceived as natural (even though it is artifical) is a vibrational effect produced by low frequencies derived from shifted down frequencies characteristic of the audible sound of the speeding car. Even though in the dubbing process a portion of the low-frequency program may be derived from a noise generator, naturally occurring inaudible sound, etc., the most integrated overall effect is achieved if the low-frequency program has at least 50% of its total energy below 40 Hz consisting of components whose frequencies are an integral fraction, plus or minus at most 10%, of respective frequency components in the audible sound program.

The integral fraction itself depends on the band of frequencies selected to be shifted down. Since the division process must result in frequencies below 40 Hz, and preferably in the 20–40 Hz range, the magnitude of the divisor increases with an increasing (higher) "parent" frequency band. A parent band of 40–80 Hz requires a divisor in the range 1.8–2.2 (2, plus or minus 10%), while a parent band of 160–320 Hz requires a divisor in the range of 7.2–8.8 (8, plus or minus 10%). As used herein, the term "integral fraction, plus or minus at most 10%," refers to the magnitude of the divisor, i.e., the denominator of the fraction, which is an integral number, plus or minus at most 10%.

Further objects, features and advantages of the invention will become apparent upon consideration of the following detailed description in conjunction with the drawing which depicts the method of the invention.

Each of plots 1, 3, 4 and 8 is a frequency spectrum, depicting the average energy at each frequency during a short interval of a sound program. Plot 1 depicts a typical audible sound program spectrum, with the audible frequencies extending from above 40 Hz to below 15 kHz (although the audible program may extend beyond both of these typical limits). The average energy at an illustrative frequency has a magnitude A as shown in the drawing.

From an inspection of plot 1 it is apparent that if a divisor of 4 is used, the substantial energy content in the 80–160 Hz band will be shifted down to the 20–40 Hz band. Arrow 2 symbolizes the derivation of a low-frequency inaudible program from the 80–160 Hz band of the audible sound program, and plot 3 represents the resulting frequency spectrum of the low-frequency signal. It should be noted that the amplitude of the low-frequency program is not an important consideration, at least during this stage of the overall method, and the amplitude A of plot 1 is shown reduced to kA in plot 3. It is the frequency content of the low-frequency program which is important.

It is apparent from the drawing that no frequencies below 80 Hz or above 160 Hz are reproduced in translated form in the low-frequency signal. Although frequencies outside the 80–160 Hz band are not reflected in the low-frequency signal, this is not to say that they should not be. Frequencies above 160 Hz may be shifted down to frequencies above 40 Hz and frequencies below 80 Hz may be shifted down to frequencies below 20 Hz. But we have found that frequencies below 20 Hz do not contribute significantly to the desired physical sensation. (If such frequencies are utilized, they should not go below 5 Hz; otherwise, the theater structure may be damaged.) As for frequencies above 40 Hz, they also do not contribute significantly to the vibrational effect, although they may be heard (as may frequencies even below 40 Hz) and thus may enhance the audible portion of the sound program as they are reproduced by the low-frequency amplifiers and speakers.

Plot 4 simply represents an additional source of low-frequency program material, in this case random noise in the 20–40 Hz band. As mentioned above, it is not necessary that the entire low-frequency vibrational sound program be derived from the audible sound program by the method of the invention. As long as 50% of the total low-frequency energy is derved in accordance with the method of the invention, the desired effect can be achieved.

Plot 8 depicts the result of adding together plots, 1, 3 and 4, as symbolized by arrows 5–7. The final composite audio signal is simply the sum of the audible and low-frequency portions. The composite signal may be recorded in a single audio track, or the low-frequency and audible portions may be recorded in separate tracks if desired. The gains in the audible and low-frequency channels of the theater sound system are adjusted to provide satisfactory sound levels, and thus the relative levels of the two portions of the overall signal recorded on the film is not of the greatest signficance. However, it is desirable to record the low-frequency program with an average energy level at least 10 db below that of the audible program (although this is not shown in the drawing so that the low-frequency part of the plot can be seen). In case the film is played in a theater not equipped with a low-frequency sound system, it is preferable not to extend a high-energy low-frequency signal to the normal sound system so as not to disturb the audible sound program.

The preferred technique for generating the low-frequency sound program is with the use of a digital delay system, such as one of those commercially available from the Eventide Clockworks Company of New York City. Such a system permits a change in the duration of a signal without affecting its pitch, or a change in the pitch of a signal without affecting its duration. The system is used in the first mode, for example, to "speed up" tapes utilized for teaching purposes. It is the second mode which is required for purposes of the present invention — the audible program signal duration is not changed, only the pitch of each of its frequency components. In order to achieve a sufficient lowering of the frequency spectrum, it may be necessary to use the system several times in succession, i.e., to use the signal output from one pass through the system as the input for the next pass, until the final spectrum is in the 20–40 Hz range.

It is to be understood that when creating the low-frequency sound program for a motion picture film, it may not be necessary to employ the technique of the invention for the entire program. For example, there may be certain scenes for which random low-frequency noise produces the desired effect. It is only for those portions of a film for which random noise does not produce a satisfactory "blended" effect that the method of the invention is necessary. By deriving the low-frequency sound program for this portion of a motion picture film for play in synchronism with the corresponding "parent" audible sound program, the overall audio/visual and physical sensations will not be disjointed.

The basic technique of the invention is to derive a low-frequency sound program, a substantial percentage of the energy of which is harmonically relates to respective frequencies in the audible, or conventional, sound program. But this does not require that the same relationship exist between all pairs of high frequency and low-frequency components. For example, referring to the drawing, the 80-Hz frequency component could result in a 20Hz component whose amplitude is the same while the 160-Hz component could result in a 40-Hz component whose amplitude is twice as great. What this means is that after an initial low-frequency program is derived, it may be modified. For example, within the low-frequency program itself certain bands of frequencies may be amplified relative to others. Or it may even be that frequencies with different amplitudes are equalized. It is not essential that the low-frequency spectrum be a replica of the "parent" audible-frequency spectrum. What is essential is that there be an harmonic relationship between the frequency components in the low-frequency program and the respective frequency components in the audible program. Once the correct frequencies are selected for the low-frequency program (based upon the relationship of an integral fraction, plus or minus at most 10%), the program itself may be processed into a final form in accordance with the creative judgment of the sound engineers doing the work — as long as 50% of the total energy below 40 Hz consists of frequency components which are harmonically related to respective components in the audible program.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What we claim is:

1. A method for producing a sound program for a sound motion picture capable of simulating a physiological and psychological sensation in an audience viewing said motion picture comprising the steps of:

(a) generating at least a portion of the audible sound program for said motion picture, (b) processing said generated audible sound program to produce a low-frequency sound program capable, during subsequent synchronous playback with the projection of said motion picture, for simulating said physiological and psychological sensation, and (c) recording synchronously said generated audible sound program and said produced low-frequency sound program for subsequent playback synchronously with the projection of said motion picture.

2. A method for producing a sound program in accordance with claim 1 wherein in step (b) at least 50% of the total energy content in said low-frequency sound program below 40 Hz is produced by shifting down in frequency said generated audible sound program.

3. A method for producing a sound program in accordance with claim 2 wherein each frequency component included in said 50% has a frequency which is an integral fraction of a respective frequency component in said generated audible sound program, plus or minus at most 10%.

4. A method for producing a sound program in accordance with claim 13 wherein in step (c) said generated audible sound program and said produced low-frequency sound program are mixed and recorded together.

5. A method for producing a sound program in accordance with claim 5 wherein in step (c) said generated audible sound program and said produced low-frequency sound program are mixed and recorded together.

6. A method for producing a sound program in accordance with claim 1 wherein in step (c) said generated audible sound program and said produced low-frequency sound program are mixed and recorded together.

7. A sound recording, for play in synchronism with the projection of a motion picture, which is capable of simulating a physiological and psychological sensation in an audience viewing said motion picture; said sound recording including an audible sound program for said motion picture; a low-frequency sound program capable, during subsequent synchronous playback with the projection of said motion picture, for simulating said physiological and psychological sensation, said low-frequency sound program having been produced by processing at least a portion of said audible sound program; said audible and low-frequency sound programs being recorded synchronously for subsequent playback synchronously with the projection of said motion picture.

8. A sound recording in according with claim 7 wherein at least 50% of the total energy content in said low-frequency sound program below 40 Hz was produced by shifting down in frequency said at least a portion of said audible sound program.

9. A sound recording in accordance with claim 8 wherein each frequency component included in said 50% has a frequency which is an integral fraction of a respective frequency component in said at least a portion of said audible sound program, plus or minus at most 10%.

10. A sound recording in accordance with claim 9 wherein said audible and low-frequency sound programs are mixed and recorded together.

11. A sound recording in accordance with claim 7 wherein said audible and low-frequency sound programs are mixed and recorded together.

* * * * *